United States Patent [19]

Sonenshine et al.

[11] Patent Number: 4,884,361

[45] Date of Patent: Dec. 5, 1989

[54] METHODS AND APPARATUS FOR CONTROLLING ARTHROPOD POPULATIONS

[75] Inventors: Daniel Sonenshine, Virginia Beach; James G. C. Hamilton, Norfolk, both of Va.

[73] Assignee: Center for Innovative Technology, Herndon, Va.

[21] Appl. No.: 71,170

[22] Filed: Jul. 8, 1987

[51] Int. Cl.⁴ .......................... A01M 1/02; A01M 1/20
[52] U.S. Cl. .................................................. 43/132.1
[58] Field of Search ...................... 43/2, 107, 122, 131, 43/132.1

[56] References Cited

U.S. PATENT DOCUMENTS

| | | | |
|---|---|---|---|
| 251,222 | 12/1881 | Hamilton | 43/2 |
| 3,743,718 | 7/1973 | Comeau | 43/107 |
| 4,227,333 | 10/1980 | Levinson et al. | 43/107 |
| 4,671,010 | 6/1987 | Conlec et al. | 43/131 |

FOREIGN PATENT DOCUMENTS

| | | | |
|---|---|---|---|
| 0142531 | 12/1978 | Japan | 43/132.1 |
| 0917821 | 4/1982 | U.S.S.R. | 43/107 |

Primary Examiner—Nicholas P. Godici
Assistant Examiner—William Scott Andes
Attorney, Agent, or Firm—Larson and Taylor

[57] ABSTRACT

A method and apparatus for controlling the populations of harmful arthropods. The method employs a decoy shaped like a female arthropod which includes a volatile sex attractant pheromone and a mounting pheromone which, in combination, induce mating behavior in arthropods. The decoy also includes a pesticide encapsulated therein which contaminates male arthropods upon physical contact with the decoys.

13 Claims, 1 Drawing Sheet

METHODS AND APPARATUS FOR CONTROLLING ARTHROPOD POPULATIONS

FIELD OF THE INVENTION

The present invention relates to a method and apparatus for controlling populations of pest arthropods.

BACKGROUND OF THE INVENTION

There are a number of different arthropods which are considered to be pests.

Several species of arthropods employ a system of two or more pheromones to induce mating behavior; a long range attractant pheromone and a mounting/contact pheromone and in some species a genital sex pheromone. The present invention relates specifically to controlling harmful populations of arthropods which use a long-range attractant pheromone and a short-range mounting/contact pheromone for inducing mating behavior. Accordingly, "arthropod" hereinafter shall mean only those species of the phylum arthropoda which employ a two-pheromone system for inducing mating behavior.

It should be noted that both the long-range attractant pheromone and the short-range mounting/contact pheromone, hereinafter called the mounting pheromone, may be one chemical or a blend of several chemicals.

The primary method for controlling parasitic arthropod populations is by applying pesticides to host animals or plants via either spraying or dipping or a combination of both in order to eliminate the arthropods. This method has several drawbacks. The application of pesticide directly to the host animal or plant may cause contamination of the host with toxic materials. This is particularly undesirable if, for example, the host is used either directly or indirectly as a food source. This is because the pesticide is not directed specifically at the parasite but rather the parasite is affected because of the large amount of pesticide directed at the host generally.

Several methods for controlling insect populations exist which employ elements in addition to pesticides to achieve a more effective result from the application of pesticides. For example, a trap in use with beetles employs a plastic which has a pesticide and an attractive pheromone in association therewith. The pheromone attracts the beetles to the trap and causes the beetles to come into physical contact with the trap where they are contaminated with a pesticide. The male is attracted to the trap by a sexual device.

U.S. Pat. No. 4,493,161 discloses an insect trap which is formed to resemble an animal that attracts the targeted insect. This use of a visual lure in combination with a pesticide is an improvement over the use of pheromone-pesticide combination alone because the visual lure attracts the pest to the pesticide and in so doing reduces significantly dispersion of the pesticide over a wide area without loss of effectiveness. The arthropod is attracted to the trap by a visual device which represents the arthropod host, an animal.

Another variation of this theme is found in U.S. Pat. No. 229,222 which discloses an insect trap which is shaped like a plant that attracts the target insects. Again, the arthropod is attracted to the trap by a visual device which represents the arthropod host, a plant.

The use of a single pheromone may not provide the entire sequence of stimuli needed to induce prolonged mating contact between a trap and the target arthropod in all species. The target arthropod is attracted to the vicinity of the pheromone source and is expected to become entangled in an adhesive or caught in a container. Such traps may not be effective for all arthropod pest species, especially in those cases where additional chemical or physical stimuli are necessary to induce mating. Physical contact between the target arthropod and the source of pesticide is important because it increases the dose of pesticide received by the arthropod. The effectiveness of the trap improves accordingly.

Another problem with the prior art methods is that visual lures representing plants or host in combination with pheromones will not be effective in the reduction of populations of many arthropods. This is because they must be constructed to the same size as the real target and must be intermixed with the real population of hosts. However, they cannot replace the real hosts (in terms of numbers) and, therefore, they can only affect a percentage of the target arthropod population. The percentage of the target population affected is determined by the percentage of hosts replaced by the lures.

In Sonenshine, D. E., Taylor, D., and Corrigan, G. (1985). *Studies to Evaluate the Effectiveness of Sex Pheromone Impregnated Formulations for Control of Populations of the American Dog Tick Dermacenter Variablis.* Experimental and Applied Acarology 1, 23–34, it was demonstrated that a mixture of gelatin encapsulated long-range sex attractant pheromone and a pesticide would kill more males than standard application of pesticides to a host animal.

It is an object of the present invention to provide a method and apparatus for improving long-term control of arthropod populations.

It is a further object of the present invention to employ arthropod pheromones in combination with pesticides and a visual lure to improve upon the effectiveness of the use of pesticides to control arthropod populations.

It is a still further object of the present invention to provide a long-term means for controlling parasitic arthropods which may be attached to the host animal.

It is a further object of the present invention to improve arthropod population control by utilizing the multiple pheromone mating system of the arthropod to attract the arthropod to a source of pesticide.

It is a further object of the present invention that the decoys should bear resemblance to the potential arthropod by a combination of the integration of visual, olfactory, gustatory and in some instances tactile cues.

These and other objects of the invention will be apparent to one of ordinary skill from the summary and detailed description which follows.

SUMMARY OF THE INVENTION

The present invention relates to an article of manufacture for attracting and destroying arthropds which comprises a decoy arthropod, an effective amount of at least one pesticide in association with the decoy, a sufficient amount of a volatile long-range sex attractant pheromone in association with the decoy to attract an arthropod to the decoy, and a sufficient amount of at least one mounting pheromone in association with the decoy to induce physical contact between an arthropod and the decoy.

In another aspect, present invention relates to a method for controlling arthropod populations which comprises placing at least one decoy arthropod in a location where it is desired to control the arthropod population, attracting arthropods to the decoy by employing a volatile sex attractant pheromone, inducing physical contact between the arthropod and the decoy by having a sufficient amount to a mounting pheromone in association with the decoy, and contaminating an arthropod with a pesticide which is associated with the decoy.

Another object of the invention involves coating of a decoy arthropod with synthetic chemicals which represent the natural composition of the short range, mounting pheromone.

Yet another object of the present invention involves a method or producing an arthropod mounting pheromone comprising removing material from the external surface of at least one arthropod and preparing a solution of the material removed from the arthropod surface and a hydrocarbon solvent.

Moreover, the invention includes a method of making a decoy arthropod for use in controlling arthropod populations which method comprises mixing in liquid form an effective amount of a pesticide with a sufficient amount or a volatile sex attractant pheromone to attract arthropods and a moldable material which, in solid form, permits said pesticide and said volatile sex attractant pheromone to gradually leach out of said moldable material, placing said mixture in a mold, heating said mold at a temperature sufficient to cure said mixture and form a decoy arthropod and applying to the decoy a sufficient amount of a mounting pheromone to induce physical contact between an arthropod and the decoy.

DETAILED DESCRIPTION OF THE PREFERRED EMBODIMENTS

Figure 1:
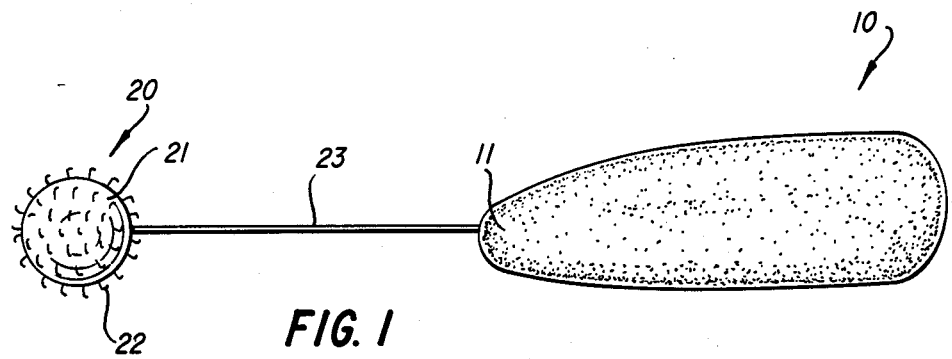
FIG. 1 is a lateral view of a decoy female arthropod and means for attaching the decoy to a host.
Figure 2:
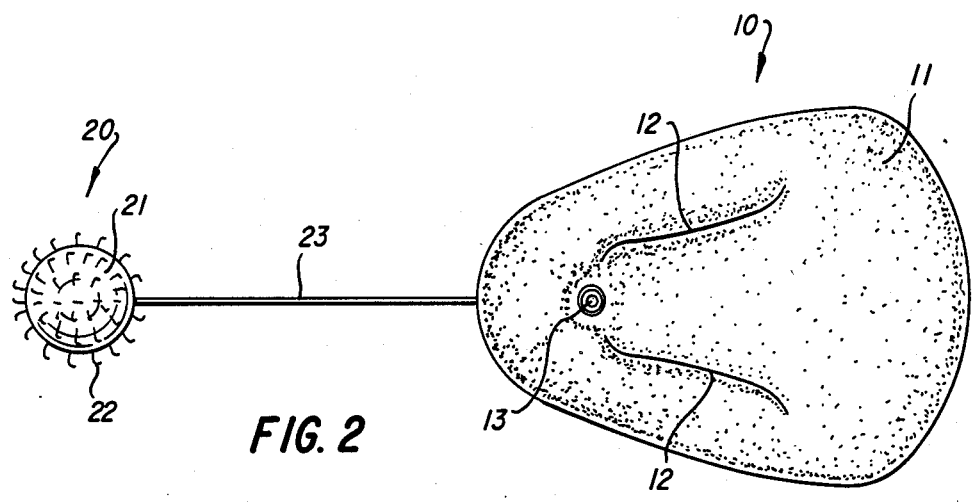
FIG. 2 is a ventral view of a decoy female arthropod and attaching means of FIG. 1.
Figure 3:
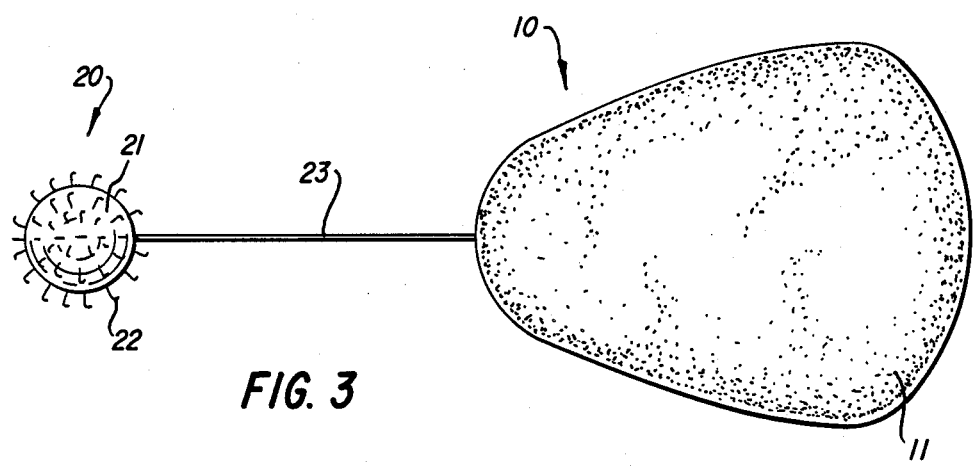
FIG. 3 is a dorsal view of a decoy arthropod and attaching means of FIG. 1.

The present invention employs a decoy arthropod as a visual lure to aid in attracting arthropods to a source of pesticide. As shown in the drawings, a typical decoy 10 includes a body portion 11 having on its surface a volatile sex attractant pheromone, pesticide and preferably a mounting pheromone. A decoy that is of an arbitrary shape will work in the present invention but a decoy having a size and shape approximately that of the species of arthropod to be attracted to the decoy is preferred because not only does it tend to be more effective in attracting the arthropod but it is more likely to induce simulated mating behavior.

Decoy 10 can be in the form of either a male or a female arthropod but the female arthropod decoy is much preferred because in arthropods, pheromones are used to attract the male to the female. Therefore, if a gender must be chosen for the decoy 10, the female gender functions best because the female arthropod tends to be relatively stationary during mating behavior whereas the male arthropod tends to move from female to female as a result of pheromone attraction.

The preferred female decoy 10 also includes a pair of grooves 12 on the ventral surface thereof. The grooves 12 make the decoy 10 a more realistic replica of the female arthropod. In addition, the grooves 12 aid the male arthropod in locating the gonopore 13 during simulated mating behavior. The presence of the gonopore 13 allows the male arthropod to simulate actual mating behavior with the decoy 10. The simulation of mating behavior results in a more prolonged period of physical contact between the male arthropod and the decoy 10 thereby increasing the likelihood that the male will be exposed to a lethal dose of pesticide.

The decoy 10 is provided with an attaching means 20 for attaching the decoy 10 to a host. Any suitable attaching means can be used for this purpose. For instance, the attaching means 20 may comprise a fabric fastener such as Velcro, or an adhesive composition provided directly on the surface of the decoy 10. In the preferred embodiment shown in the drawings the attaching means 20 comprises a spherical body 21 having a plurality of hooked and barbed protrusions 22, coated with a strong adhesive. The combination of hooked and barbed protrusions 22 and adhesive form a strong anchor between the host and the decoy 10. The attachment device 20 is connected to the decoy 10 by a cord 23, preferably formed of a suitable plastic such as Nylon.

Decoy 10 may be made by mixing, in liquid form, a pesticide, a volatile sex attractant pheromone and a carrier material which, upon solidification, allows both the pesticide and the volatile sex attractant pheromone to leach out at a predetermined rate. Once these ingredients are thoroughly mixed they are poured into a mold and the mold is heated in an oil bath to cure the carrier material using standard industrial molding procedures. After the carrier material is cured the mold is removed and the resultant product cut into the appropriate size and shape. It is also possible to mold the decoy 10 with the cord 23 molded therein thereby eliminating the need to attach cord 23 at a later time.

Once the decoy 10 has been cut to the appropriate size and shape it is preferably coated with a coating material which allows leaching therethrough of the pesticide and the volatile sex attractant pheromone. The coating also provides a surface on the decoy 10 to which a mounting pheromone and an attachment means may be adhered. This coating is unnecessary if the carrier material used to fabricate the decoy 10 has the requisite surface properties.

Once the decoy 10 has the necessary surface characteristics the mounting pheromone is applied by spraying, dipping or any other suitable means.

Any pesticide known to be effective in the destruction of arthropods can be used in the present invention. The preferred pesticides however, are those recognized as effective against arthropods but of relatively low toxicity to humans and animals. Examples of such pesticides are propoxur and synthetic pyrethroids such as permethrin. It is also possible to use organophosporus compounds as pesticides although these are less desirable due to their higher toxicity. The optimum quantity of pesticide will vary depending upon the pesticide chosen, the choice of carrier material and the species of arthropod to be controlled. In general, the concentration of the pesticide will fall in the range of one percent pesticide per decoy.

The volatile sex attractant pheromone employed will vary depending upon the species of arthropod to be controlled. However, in some cases a single volatile sex attractant pheromone will work for several arthropod species. In the case of the family Ixodidae, the volatile sex attractant pheromone is selected from the phenols having the ability to attract male Ixodids. 2,6-Dichlorophenol is an example of such a pheromone. The volatile sex attractant pheromone is normally present in quantities of about 10 to about 50 micrograms per decoy 10. Again, the optimal amount of volatile sex attractant pheromone will vary depending on the species of arthropod to be controlled, the carrier material that is chosen, and the desired active life of the decoy 10. Since the volatile sex attractant pheromone leaches out of the decoy 10 over time, the active life of the decoy 10 will be dictated by the quantity of attractant pheromone incorporated therein as well as by the rate at which the volatile sex attractant pheromone leaches out. Once decoy 10 becomes depleted of sex attractant pheromone it will no longer function. This is also true when the pesticide incorporated in the decoy 10 has become exhausted.

The carrier material from which the decoy 10 is fabricated must be a moldable material which allows both the pesticide and the volatile sex attractant pheromone to leach out of the decoy 10. Generally the carrier material will be chosen based on the rate at which it allows these ingredients to leach out. In addition, it is possible to adjust the concentrations of the pesticide and the attractant pheromone to compensate for the leaching rate of the carrier material. Suitable carrier materials included gelatin and any natural or synthetic polymer material capable of being used in microencapsulation. Polyvinylchloride is an example of a suitable polymeric carrier material.

As aforementioned, the optional coating (not shown) of the decoy 10 is only necessary if the carrier material is such that either the mounting pheromone or, if desired, the adhesive composition will not adhere to the surface of the decoy 10. When polyvinylchloride is used as the carrier material it is usually unnecessary to coat the decoy 10 although, depending upon the specific mounting pheromone to be used, this may not always be the case. The coating material not only must be capable of binding with an adhesive and the mounting pheromone, it must also allow the pesticide and the attractant pheromone to leach out of the decoy 10. The preferred coating material is a synthetic plastic material such as polyvinylchloride.

The mounting pheromone selected depends upon the species of arthropod to be controlled. Mounting pheromones may be conveniently obtained, for example, by direct extraction from the species or arthropod to be controlled or by direct chemical synthesis. Extraction may be accomplished by removing material from the surface of an arthropod and forming a solution of this material in a hydrocarbon solvent such as hexane. The amount of mounting pheromone applied to the surface or the decoy 10 must be at least one female equivalent wherein a female equivalent is defined as the amount of mounting pheromone present in one female of the species of arthropod to be controlled. In the case or Ixodids, for example, about 50 to 500 nanograms or mounting pheromone is applied to the surface of each decoy 10. Again the quantity or mounting pheromone to be used will depend on the species of arthropod to be controlled.

In use several decoys 10 are applied to the surface of a host animal. This can be achieved in various ways. It is possible to manually apply the decoys 10 to the surface of a host animal whereby the combination of hooked and barbed protrusions 22 and adhesives will strongly adhere the decoys 10 to the host animal. The decoys 10 may also be applied by dispersing a large number of them in a lotion and pouring the lotion onto the host animal's coat. Another method of applying the decoys 10 to a host animal is to disperse thousands of decoys 10 in a dip and then force the host animal to walk through the dip solution to coat the host animal with decoys 10.

The decoys 10, where possible, should be positioned on the host animal so that they will not be removed by host grooming activity. For example, the decoys should be positioned on the head and neck since host grooming will not remove them and additionally since the highest incidence of tick infestation usually occurs in these areas. In the case of exotic cattle where infestation occurs over the entire body the decoys 10 are placed all over the body of the host animal.

Study of the mating behavior of arthropods revealed that several species employ at least two pheromones to induce mating behavior. Female arthropods release a volatile sex attractant pheromone into the surrounding atmosphere. This attractant pheromone enables the male arthropod to locate the female arthropod. Once the male arthropod is in the vicinity of the female it encounters a mounting pheromone which induces the male to mount the female, locate the gonopore and copulate. The presence of both of these pheromones is necessary for successful copulation.

In operation, after the decoy 10 has been attached to the host animal the volatile sex attractant pheromone slowly leaches out of decoy 10 onto the surface and then into the atmosphere in the vicinity of the decoy 10 where it attracts sexually active male arthropods. Once the male is in the immediate vicinity of the decoy 10 the mounting pheromone will induce the male arthropod to mount the decoy 10 and copulate with it. Physical contact between the male arthropod and the decoy 10 results in the male arthropod receiving a lethal or sublethal dose of pesticide. This in turn will reduce the number of successful mating encounters between male and female arthropods by either reducing the number of male arthropods or, in the case of a sub-lethal doses of pesticide, selectively lowering the males' fecundity and/or their ability to mate successfully.

Since the present invention uses species specific pheromones and as a result is highly attractive to members of the target species, it has an extremely minor effect on other non-harmful or beneficial arthropod species.

The decoys 10 can be easily removed from the hide, skin, hair, wool or fur of the host animals so as not to diminish the animal's economic value.

The following representative examples are included to illustrate specific embodiments of the present invention.

EXAMPLE 1

Extraction of the Mounting Pheromone from Ixodids

The mounting pheromones of Ixodids *Dermacenter variabilis* and *Dermacenter andersoni* were extracted by first cleaning out the interior contents of 100 ticks. Then, the tick cuticle was added to hexane and the lipids contained therein were extracted into the hexane for 4 hours. The resultant extract included among its ingredients a compound capable as acting as a mounting pheromone for the species of tick that it was extracted from.

EXAMPLE 2

Preparation of a Decoy Ixodid

A decoy Ixodid was prepared by mixing a ten percent solution of propoxur in polyvinylchloride and adding 30 micrograms of 2,6-Dichlorophenol as a volatile, long range, sex attractant pheromone. The liquid was then stirred and poured into a standard mold. The mold was put into an oil bath at about 300° F. to cure the polyvinylchloride. After curing, the mold was broken off and the polyvinylchloride was extruded and cut into pieces 5 mm long and 5 mm wide. Then, 250 nanograms of the solution of mounting pheromone in cold hexane was sprayed onto the surface of the decoy and an attachment device as shown in the drawings was adhesively attached to the decoy. The resultant decoy remained active for two to three months.

EXAMPLE 3

Excitation of male mounting pheromone responses by female tick extracts deposited on inanimate objects (dummy ticks).

| Extract Added | Species of Male Used | T/C | N | No. Compl. Test | % Compl. Test | Total Score | % Score | Time Analysis |
|---|---|---|---|---|---|---|---|---|
| None | DA | C | 20 | 0 | 0 | 22 | 22.8 | |
| 1 DA | DA | T | 20 | 4 | 20 | 48 | 60.0* | p = 0.0031 |
| 2 DV | DA | T | 20 | 1 | 5 | 30 | 37.5$^{ns}$ | p = 0.2742 |
| None | DV | C | 20 | 0 | 0 | 16 | 20.0 | |
| 3 DV | DV | T | 20 | 7 | 35 | 53 | 66.3** | p = 0.0047 |
| 4 DA | DV | T | 20 | 3 | 15 | 41 | 51.3* | p = 0.0001 |

T = Test;
C = Control;
N = Number of repetitions;
No. Compl. Test = Total number of males reaching the gonopore stage;
% Compl Test = % of males reaching the gonopore;
Total Score = Total score calculated by adding up the points gained by all male ticks;
% Score = % of Total score compared to the total possible score;
Time Analysis = Paired t-test comparison between test and controls of total time spent on dummy ticks
(*p 0.05, **p 0.01).
ns = No significance;
Score = The ticks were given 1 point for completing each stage of the mating process. For the purpose of scoring the mating process was divided into 4 discrete stages.

This invention has been described in detail with particular reference to certain preferred embodiments thereof, but it is to be understood that variations and modifications can be effected within the spirit of the invention and the scope of the invention is to be determined from the claims appended hereto.

We claim:

1. An article of manufacture for attracting and destroying arthropods comprising: a decoy arthropod, an effective amount of at least one pesticide in association with said decoy, a sufficient amount of at least one volatile sex attractant pheromone in association with said decoy to attract an arthropod to said decoy, and a sufficient amount of at least one mounting pheromone in association with said decoy to induce physical contact between an arthropod and said decoy.

2. An article of manufacture as claimed in claim 1 wherein said volatile sex attractant pheromone is impregnated within said decoy in a manner which allows said volatile sex attractant pheromone to gradually leach out of said decoy.

3. An article of manufacture as claimed in claim 2 wherein said pesticide is impregnated in said decoy in a manner which allows said pesticide to gradually leach out of said decoy.

4. An article of manufacture as claimed in claim 3 wherein said mounting pheromone is coated onto the surface of said decoy.

5. An article of manufacture as claimed in claim 4 wherein said decoy further comprises at least one gonopore to allow simulation of actual mating behavior between a male arthropod and said decoy.

6. An article of manufacture as claimed in claim 5 wherein said pesticide is selected from organophosphorus compounds.

7. An article of manufacture as claimed in claim 5 wherein said pesticide is selected from synthetic pyrethroids.

8. An article of manufacture as claimed in claim 5 wherein said decoy has the approximate size and shape of a female selected from the family Ixodidae said volatile sex attractant pheromone is selected from the phenols have the ability to attract males from the family Ixodidae.

9. An article of manufacture as claimed in claim 8 wherein said volatile sex attractant pheromone is 2,6-Dichlorophenol.

10. An article of manufacture as claimed in claim 5 further comprising a means for attaching said decoy to a host animal.

11. An article of manufacture as claimed in claim 10 wherein said means for attaching said decoy to a host animal comprises a fabric fastener.

12. An article of manufacture as claimed in claim 1 wherein said mounting pheromone is chemically synthesized.

13. A method for controlling arthroped populations which comprises:
   placing at least one arthroped decoy in a location where it is desired to control the arthroped population said decoy having a volatile sex attractant pheromone, a mounting pheromone and a pesticide in association with said decoy;
   attracting arthropods to said decoy by means of said volatile sex attractant phermone; inducing physical contact between said decoy and said arthroped by means of said mounting phermone thereby causing contamination of said arthroped with said pesticide.

* * * * *